(12) United States Patent
Koga et al.

(10) Patent No.: US 10,464,511 B2
(45) Date of Patent: Nov. 5, 2019

(54) BUMPER REINFORCEMENT AND VEHICLE INCLUDING THE SAME

(71) Applicant: NIPPON STEEL & SUMITOMO METAL CORPORATION, Tokyo (JP)

(72) Inventors: Atsuo Koga, Amagasaki (JP); Yoshiaki Nakazawa, Takarazuka (JP)

(73) Assignee: NIPPON STEEL CORPORATION, Tokyo (JP)

( * ) Notice: Subject to any disclaimer, the term of this patent is extended or adjusted under 35 U.S.C. 154(b) by 113 days.

(21) Appl. No.: 15/742,065

(22) PCT Filed: Jul. 5, 2016

(86) PCT No.: PCT/JP2016/069858
§ 371 (c)(1),
(2) Date: Jan. 5, 2018

(87) PCT Pub. No.: WO2017/006925
PCT Pub. Date: Jan. 12, 2017

(65) Prior Publication Data
US 2018/0194310 A1    Jul. 12, 2018

(30) Foreign Application Priority Data

Jul. 8, 2015  (JP) ................. 2015-137098

(51) Int. Cl.
*B60R 19/18*  (2006.01)
*B60R 19/04*  (2006.01)

(52) U.S. Cl.
CPC .............. *B60R 19/18* (2013.01); *B60R 19/04* (2013.01); *B60R 2019/1813* (2013.01)

(58) Field of Classification Search
CPC .. B62D 25/025; B62D 25/04; B62D 25/2036; B62D 21/157; C08L 23/06;
(Continued)

(56) References Cited

U.S. PATENT DOCUMENTS 4,350,378 A * 9/1982 Wakamatsu ............ B60R 19/18
293/109
4,361,352 A * 11/1982 Wakamatsu ............ B60R 19/18
293/109
(Continued)

FOREIGN PATENT DOCUMENTS

JP    2007-521173    8/2007
JP    2010-280268    12/2010
(Continued)

*Primary Examiner* — Kiran B Patel
(74) *Attorney, Agent, or Firm* — Clark & Brody

(57) ABSTRACT

A bumper reinforcement (10) includes a first member (1), and a second member (2). The first member (1) includes a first flat sheet (11), and two first parts (12). The first parts (12) are respectively connected to two side edges of the first flat sheet (11). The second member (2) includes a second plate (24), two wall parts (22), two flanges (21), and two second parts (23). The wall parts (22) are respectively connected to two side edges of the second plate (24). The flanges (21) are respectively connected to the two wall parts (22). The second parts (23) are respectively connected to side edges of the two flanges (21), and are provided so as to correspond to the first parts (23). The two flanges (21) of the second member (2) are joined with the first flat sheet (11) of the first member (1). The first parts (23) stand up toward the second member (2) side.

12 Claims, 9 Drawing Sheets

(58) Field of Classification Search
CPC ...... C08L 2666/06; C08L 75/04; C08L 23/10; C08L 53/00; C08L 69/00
USPC .................................................. 193/102, 120
See application file for complete search history.

(56) References Cited

U.S. PATENT DOCUMENTS

| | | | | |
|---|---|---|---|---|
| 4,765,665 A * | 8/1988 | Akahoshi | ................ | B60R 19/18 293/102 |
| 5,154,462 A | 10/1992 | Carpenter et al. | | |
| 6,474,726 B1 * | 11/2002 | Hanakawa | ............. | B62D 25/04 296/187.12 |
| 6,481,690 B2 * | 11/2002 | Kariatsumari | .......... | B60R 19/18 293/102 |
| 6,554,345 B2 * | 4/2003 | Jonsson | ................ | B60J 5/0444 296/146.6 |
| 6,843,524 B2 * | 1/2005 | Kitagawa | ............. | B62D 21/155 180/312 |
| 6,863,321 B2 * | 3/2005 | Jonsson | ................ | B60R 19/18 228/146 |
| 7,794,006 B2 * | 9/2010 | Karlander | ............... | B60R 19/18 296/102 |
| 8,061,743 B2 * | 11/2011 | Wakabayashi | .......... | B60R 19/18 293/102 |
| 8,403,403 B2 * | 3/2013 | Tashiro | .................. | B60R 19/02 180/68.4 |
| 8,408,632 B2 * | 4/2013 | Shimotsu | ................ | B60R 19/18 296/102 |
| 8,480,163 B2 * | 7/2013 | Mori | .................... | B62D 21/157 29/897.2 |
| 8,562,068 B2 * | 10/2013 | Yoshida | ............... | B62D 21/152 296/187.03 |
| 8,585,129 B2 * | 11/2013 | Mori | .................... | B62D 21/152 296/187.09 |
| 8,622,446 B2 * | 1/2014 | Handing | ................ | B60R 19/18 293/155 |
| 8,668,234 B2 * | 3/2014 | Yamaguchi | ............. | B60R 19/18 293/120 |
| 8,820,804 B2 * | 9/2014 | Shibata | .................... | B60R 19/18 293/117 |
| 8,985,651 B2 * | 3/2015 | Honda | ..................... | B60R 19/18 293/120 |
| 9,227,666 B2 * | 1/2016 | Yoshioka | ............... | B62D 25/04 |
| 9,260,137 B2 * | 2/2016 | Honda | ................. | B62D 29/002 |
| 9,321,487 B2 * | 4/2016 | Honda | ................... | B62D 25/00 |
| 9,340,237 B2 * | 5/2016 | Kurokawa | ........... | B62D 29/005 |
| 9,440,678 B2 * | 9/2016 | Kurokawa | ............. | B62D 21/02 |
| 9,452,781 B2 * | 9/2016 | Kurokawa | ......... | B62D 25/2045 |
| 9,682,674 B2 * | 6/2017 | Corwin | .................... | B60R 19/03 |
| 9,688,226 B2 * | 6/2017 | Suzumori | ............. | B60R 19/023 |
| 9,701,345 B2 * | 7/2017 | Kanemori | ............. | B62D 21/152 |
| 9,771,106 B2 * | 9/2017 | Ogawa | ..................... | B60R 19/24 |
| 9,828,032 B2 * | 11/2017 | Watanabe | ............ | B62D 21/152 |
| 9,902,429 B2 * | 2/2018 | Okada | .................... | B23K 26/22 |
| 9,975,506 B2 * | 5/2018 | Handing | ................ | B60R 19/18 |
| 9,988,087 B2 * | 6/2018 | Yamamoto | ............ | B62D 25/025 |
| 10,035,324 B2 * | 7/2018 | Yasuyama | ............ | B21D 35/007 |
| 10,059,376 B2 * | 8/2018 | Heitkamp | ............. | B62D 25/04 |
| 10,059,381 B2 * | 8/2018 | Otsuka | ................. | B62D 27/026 |
| 2003/0020291 A1 | 1/2003 | Roussel et al. | | |
| 2013/0119680 A1 * | 5/2013 | Kosaka | .................... | B60R 19/18 293/102 |
| 2015/0102614 A1 | 4/2015 | Arns | | |
| 2017/0073011 A1 * | 3/2017 | Sugano | ................ | B62D 21/152 |
| 2017/0088075 A1 * | 3/2017 | Hashimoto | ............... | F16F 7/12 |
| 2018/0001853 A1 * | 1/2018 | Koga | ..................... | B60R 19/04 |

FOREIGN PATENT DOCUMENTS

| | | |
|---|---|---|
| JP | 2011-219001 | 11/2011 |
| WO | 2014/142733 | 9/2014 |

* cited by examiner

BUMPER REINFORCEMENT AND VEHICLE INCLUDING THE SAME

TECHNICAL FIELD

The present invention relates to a bumper reinforcement, and a vehicle including the bumper reinforcement.

BACKGROUND ART

A body of a vehicle such as an automobile includes various structural members. One of such structural members includes a bumper reinforcement (hereinafter, also referred to as a "BR"). A BR, which is also called as a bumper beam, is attached to a front part of the vehicle. The BR may also be attached to a rear part of the vehicle. This is for the purpose of bearing a load upon collision, thereby ensuring safety of humans in the vehicle. Typically, the BR is constituted by combining a panel made of a steel sheet and having a hat-shaped cross section with a closing plate (hereinafter, also referred to as a "CP") which is made of a planar steel sheet. A flange part of the panel and the CP are superposed on each other, and the superposed part is joined by welding.

Both anti-collision performance and light-weightedness are demanded for the BR at the same time. In other words, improvement of energy absorption efficiency (EA/mass) is demanded for the BR. The energy absorption efficiency is a value obtained by dividing the absorbed energy of the BR by the weight of the BR. To cope with such demands, conventionally, there have been proposed BRs in which the shape of the panel having a hat-shaped cross section is advantageously contrived.

National Publication of International Patent Application No. 2007-521173 (Patent Literature 1) discloses a bumper beam which includes a panel having a reinforced part in a central area in its lengthwise direction. The reinforced part is provided in at least one flange part of the two flange parts. The reinforced part protrudes in a curved fashion from an edge of the flange part. Patent Literature 1 describes that providing the reinforced part in a part of the panel can improve energy absorption performance of the entire bumper beam.

Japanese Patent Application Publication No. 2011-219001 (Patent Literature 2) discloses a BR which includes a panel having a concave-shaped bead in a flange part. The concave-shaped bead makes up a passage which provides communication between the inside and outside of the BR. Patent Literature 2 describes that providing a bead in the flange part of the panel allows a coating liquid to flow into the BR at the time of production of a vehicle body, while ensuring strength of the BR.

CITATION LIST

Patent Literature

Patent Literature 1: National Publication of International Patent Application No. 2007-521173
Patent Literature 2: Japanese Patent Application Publication No. 2011-219001

SUMMARY OF INVENTION

Technical Problem

In order to successfully achieve both anti-collision performance and light-weightedness at the same time, conventionally, in addition to advantageously contriving the shape of the panel, measures to increase the material strength of the BR have been adopted.

However, as the material strength increases, break-off at a joined part between the panel and the CP becomes more likely to occur. The causes thereof are as follows. First, due to additive elements for improving the material strength, the strength of the joined part by welding decreases locally. Secondly, if the amount of deformation of the BR due to a collision load is constant, as the material strength increases, the load to act on the joined part increases.

FIGS. 9A and 9B are schematic diagrams to show one example of deformation behavior of a BR, which induces break-off of the joined part. In the example shown in FIGS. 9A and 9B, the BR is constituted by a CP 81 and a panel 82. The BR is disposed such that the CP 81 faces toward the outside of the vehicle. Therefore, a collision load is inputted from the CP 81 side. FIG. 9A is a cross sectional view of the BR attached to a vehicle when viewed from sideward of the vehicle. FIG. 9B is a plan view of the BR attached to the vehicle when viewed from upward of the vehicle.

When a collision load is inputted from the CP 81 side, as shown in FIG. 9A, the flange part of the panel 82 deforms in an advancing direction of the collision load. Moreover, as shown in FIG. 9B, the CP 81 deflects in a wavy fashion. As a result of this, a peel force is generated in the joined part. When the joined portion is discontinuous such as, for example, a joined part by spot welding, the peel force is concentrated on the joined part, causing the joined part to be broken off in an early stage. Moreover, when the joined portion is continuous such as, for example, a joined part by laser welding, localization of peel force is suppressed, and suppressing effect against break-off of the joined part can be expected. However, there will be no effect to suppress the deformation itself of the BR, which induces break-off of the joined part. Therefore, when the material strength is increased without change of sheet thickness, or when the sheet thickness is increased without change of the material strength, peel force, which is not less than resistant force, is generated in the joined part, leading to break-off of the joined part.

According to techniques of Patent Literatures 1 and 2, deformation of the flange part as shown in FIG. 9A may be able to be suppressed. However, it is not possible to suppress deflection of the CP as shown in FIG. 9B. Therefore, it is difficult to avoid break-off of the joined part even with the techniques of Patent Literatures 1 and 2.

If a break-off occurs in a joined part, the load which the BR itself can endure decreases, and energy absorption will decrease. For that reason, it becomes difficult to sufficiently achieve effects of strength enhancement of the material.

The present invention has been made in view of the above described situations. One object of the present invention is to provide a bumper reinforcement and a vehicle, which can suppress break-off of a joined part upon collision, and sufficiently absorb collision load.

Solution to Problem

A bumper reinforcement according an embodiment of the present invention includes a first member, and a second member. The first member includes a first flat sheet, and two first parts. The first flat sheet extends in a longitudinal direction. The first parts are respectively connected to two opposing side edges of the first flat sheet along the longitudinal direction, and are provided in a part or all of the opposing side edges of the flat plate part. The second member includes a second plate, two wall parts, two flanges, and two second parts. The second plate extends in the longitudinal direction. The wall parts are respectively connected to two opposing side edges of the second plate along the longitudinal direction. The flanges are respectively connected to the two wall parts. The second parts are provided so as to be respectively connected to opposing side edges of the two flanges along the longitudinal direction, and to correspond to the first parts. The two flanges of the second member are joined with the first flat sheet of the first member. The first parts extend along on a side of the second member.

Moreover, a vehicle according to an embodiment of the present invention includes the above described bumper reinforcement in the front part or rear part thereof. Then, the first member is disposed facing toward the outside of the vehicle.

Advantageous Effects of Invention

A bumper reinforcement and a vehicle according to an embodiment of the present invention enables to suppress break-off of a joined part upon collision, and to sufficiently absorb a collision load.

DESCRIPTION OF EMBODIMENTS

Figure 1:
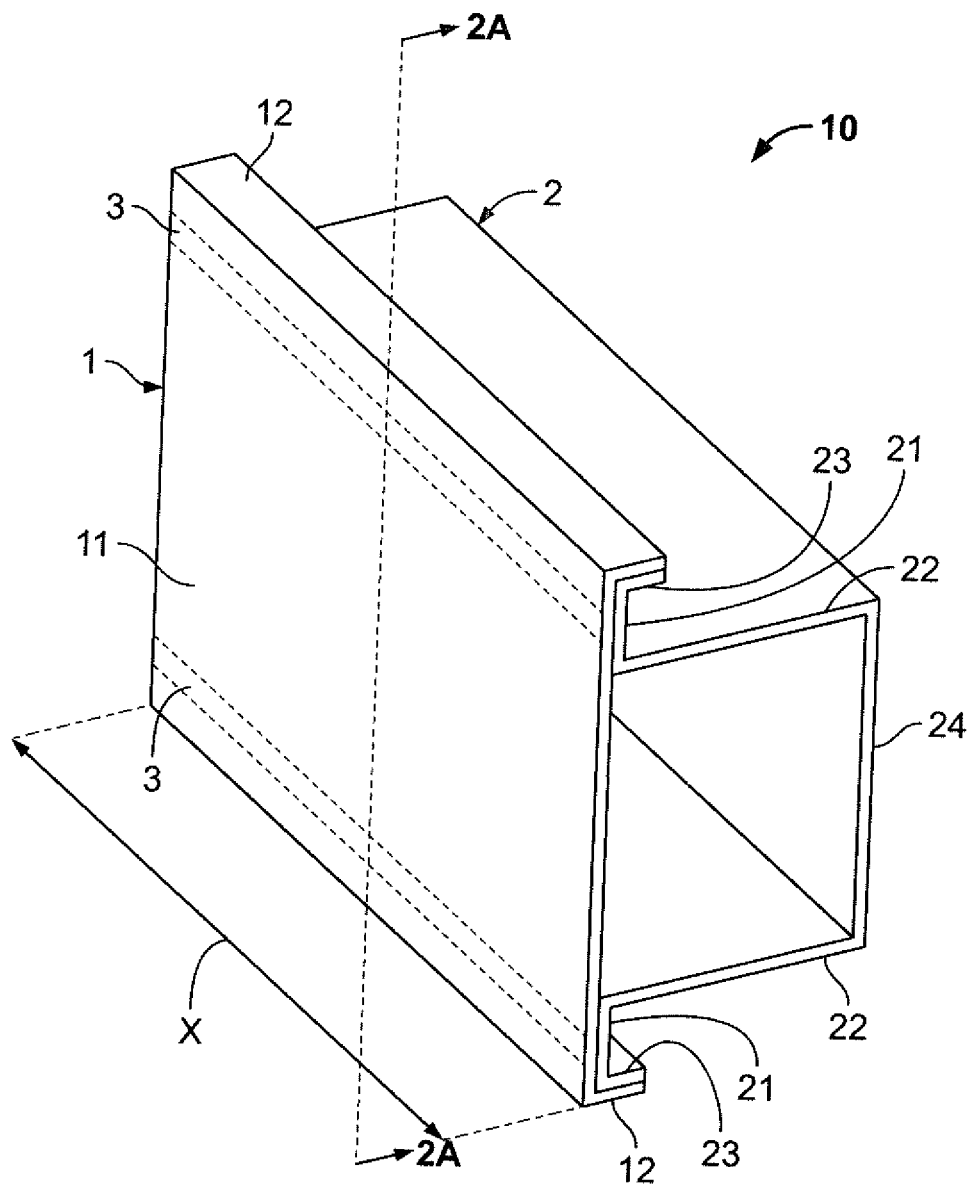
FIG. 1 is a perspective view to show one example of a bumper reinforcement of the present embodiment.

In order to solve the above described problems, the inventors of the present invention have conducted diligent research, resulting in obtaining the following findings. A causal factor of occurrence of break-off of a joined part of the bumper reinforcement is out-of-plane deformation in the surrounding of the joined part due to compressive force generated in the lengthwise direction of a BR upon collision. For that reason, if it is possible to suppress out-of-plane deformation in the surrounding of a joined part upon collision, it becomes possible to suppress break-off of the joined part, thereby improving anti-collision safety. To suppress out-of-plane deformation in the surrounding of the joined part, it is only necessary to improve the rigidity of the two members (panel and CP) constituting the BR.

Specifically, for a long-size panel having a hat-shaped cross section (corresponding to the second member), a first part (second part) is provided on a side edge along the lengthwise or longitudinal direction in the flange of the panel, so as to extend stand up from the side edge. As a result of this, a ridge along the lengthwise direction is made up in the panel, thus improving the rigidity of the panel. Further, regarding a long-size CP (corresponding to first member) to which a collision load is to be inputted, a first part is provided in the side edge along the lengthwise direction in the CP, so as to extend from the side edge. As a result of this, a ridge along the lengthwise direction is made up in the CP, thereby improving the rigidity of the CP. Increases in the rigidity of both the panel and the CP (particularly, the rigidity of the side edge parts of the both) will suppress deformation in the vicinity of the joined part upon collision. As a result of that, it becomes possible to mitigate load generated at a joined part, thereby suppressing break-off of the joined part.

The bumper reinforcement and the vehicle of the present invention have been completed based on the above described findings.

The BR according to an embodiment of the present invention includes a first member, and a second member. The first member includes a first flat sheet and two first parts. The first flat sheet extends in a longitudinal direction. The first part is connected to each of the two side edges of the first flat sheet along the longitudinal direction. Further, the first part is provided in all of, or a part of the side edge of the flat plate part. The second member includes a second plate, two vertical wall parts, two flanges, and two second parts. The second plate extends in the longitudinal direction. The vertical wall parts are respectively connected to the two side edges of the second plate along the longitudinal direction. The flanges are respectively connected to the two vertical wall parts. The second parts are respectively connected to side edges of the two flanges along the longitudinal direction. Further, the second parts are provided so as to correspond to the first parts. The two flange parts of the second member are joined with the first flat sheet of the first member. The first parts stand up on or extend from a side of the second member.

Here, the first member corresponds to a long-size closing plate. The second member corresponds to a long-size panel. In a typical example, the first member is made of metal sheet (examples: cold-rolled steel sheet, hot-rolled steel sheet, hot-dip galvanized steel sheet, alloyed hot-dip galvanized steel sheet, aluminum sheet, etc.). The second member is made of metal sheet (examples: cold-rolled steel sheet, hot-rolled steel sheet, hot-dip galvanized steel sheet, alloyed hot-dip galvanized steel sheet, aluminum sheet, etc.). The material qualities of the first member and the second member may be the same or different. The first member can be formed into an appropriate shape by press working. The second member can be formed into an appropriate shape by press working. The press working may be cold working, or may also be hot stamping in which quenching is performed concurrently with forming. However, processing method for obtaining the first and second members may be, not limited to press working, other processing methods (example: bending, etc.). Joining of the two flange parts of the second member with the flat plate part of the first member may be performed by resistance spot welding. Such joining may be performed by welding such as laser welding, and may also be performed by adhesives.

The BR is attached to the front part or the rear part of a vehicle. Then, the first member is disposed facing toward the outside of the vehicle. In other words, the second member is disposed facing toward the inside of the vehicle. In this case, the second member is attached to the body of the vehicle, and collision load is inputted to the first member side.

The above described a direction means the lengthwise direction of the BR. In terms of the BR being attached to the vehicle, the above described a direction means a left and right direction (vehicle width direction). The first part may be provided on all of the two side edges of the first flat sheet in the first member, or on a part of the side edges. In a typical example of an aspect in which the first part is provided on a part of the side edge of the first flat sheet, the first part is provided in a central area in the lengthwise direction. The second part may be provided on all of the side edges of the two flanges in the second member, or on a part of the side edges. In a typical example of an aspect in which the second part is provided on a part of the side edge of the flange, the second part is provided in the central area in the lengthwise direction so as to correspond to the position of the first part. Note that, the region where the first part is provided does not necessarily need to coincide with the region of the second part, and may be larger than the region of the second part.

According to the BR of the present embodiment, a first part is provided on a side edge along the lengthwise direction in the first member (CP). Further, a second part is provided on the side edge along the lengthwise direction in the flange of the second member (panel) so as to correspond to the first part. As a result of this, ridges along the lengthwise direction are made up on the side edges of both the first member and the second member, thereby improving rigidity of the both. For that reason, deformation in the vicinity of the joined part is suppressed upon collision. As a result of that, it is possible to mitigate load generated in a joined part, thereby suppressing break-off of the joined part. Therefore, the BR can sufficiently absorb collision load.

Further, when joining between the first member and the second member is performed by spot welding, there are also advantages as follows. It becomes possible to reduce the strength demanded for the joined part. For that reason, the number of welding parts (welding spots) can be reduced. Moreover, the nugget diameter of welding parts can be decreased. Therefore, workability necessary for the joining (spot welding) will be improved.

In the BR of the present embodiment, it is preferable to adopt the following configurations. The first part includes a first ridge adjacent to the first flat sheet, and a first flat portion adjacent to the first ridge. The second part includes a second ridge adjacent to the flange, and a second flat portion adjacent to the second ridge. In a cross section across the direction, a gap (hereinafter, also referred to as a "gap between first and second parts") between a boundary between the second ridge and the second flat portion, and a boundary between the first ridge and the first flat portion is not less than 0 mm and less than 9 mm.

The gap between first and second parts is preferably as close to zero as possible. Most preferable condition is that the boundary between the second ridge and the second flat portion, and the boundary between the first ridge and the first flat portion are in contact with each other. This is because, as the gap between first and second parts decreases, the suppression effect against break-off of the joined part increases. On the other hand, an excessively large gap between first and second parts will decrease the suppression effect against break-off of the joined part. In this case, as the result of the width of the first member being increased, the weight of the first member increases, and thus the weight of the entire BR increases. Moreover, when the gap between upstanding parts is not less than 9 mm, there is a risk that break-off of a joined part may occur. Therefore, the gap between first and second parts is preferably not more than 0 mm and less than 9 mm.

In the case of that BR, it is preferable to further adopt the following configurations. In a cross section across the direction, the lengths of the first and second flat parts are not less than 5 mm.

It is only necessary that the length of the first and second flat portions (hereinafter, also referred to as "flat part length") is more than 0 mm. However, an excessively small flat part length will decrease the suppression effect against break-off of the joined part. Therefore, the flat part length is preferably not less than 5 mm. The upper limit of the flat part length is not particularly limited. However, an excessively large flat part length will increase the weight of the first and second member, and thus the weight of the entire BR increases. Therefore, the preferable upper limit of the flat part length is about 15 mm.

In the BR of the present embodiment, it is preferable to adopt the following configurations. The tensile strength of at least one of the first member and the second member is not less than 1180 MPa.

However, the tensile strengths of the first and second members are not particularly limited. If the tensile strength of at least one of the first member and the second member is not less than 1180 MPa, advantageous effects of the present embodiment will be effectively exhibited. More preferably, the tensile strengths of both the first member and the second member are not less than 1180 MPa. Forming the first and second members by hot stamping will result in that the tensile strengths of those members are 1470 MPa to 2500 MPa.

A vehicle according to an embodiment of the present invention is provided with the above described BR in a front part of rear part thereof. And the first member is disposed facing toward the outside of the vehicle. According to the vehicle of the present embodiment, as described above, it is possible to suppress break-off of the joined part of the BR upon collision, thus sufficiently absorbing collision load.

Hereinafter, embodiments of the present invention will be described in detail with reference to the drawings.

Figure 2A:
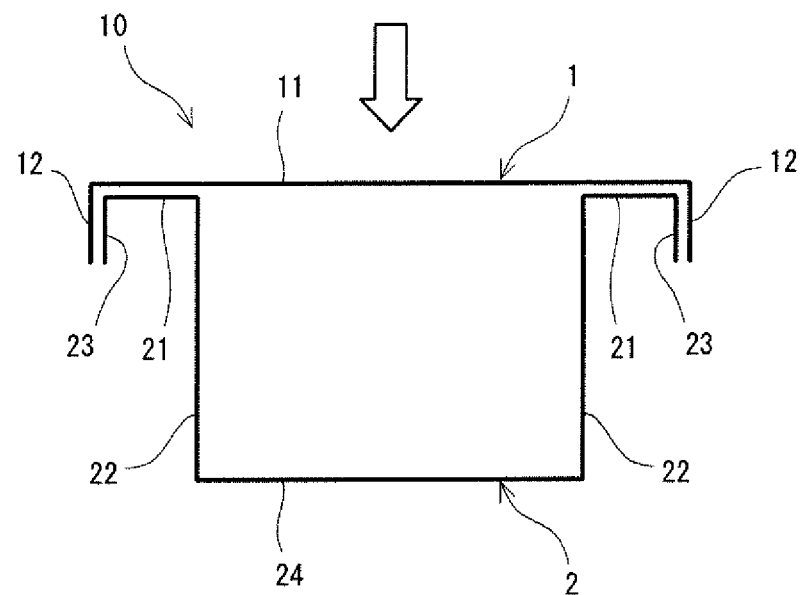
FIG. 2A is a cross sectional view of the bumper reinforcement of the present embodiment.
Figure 2B:
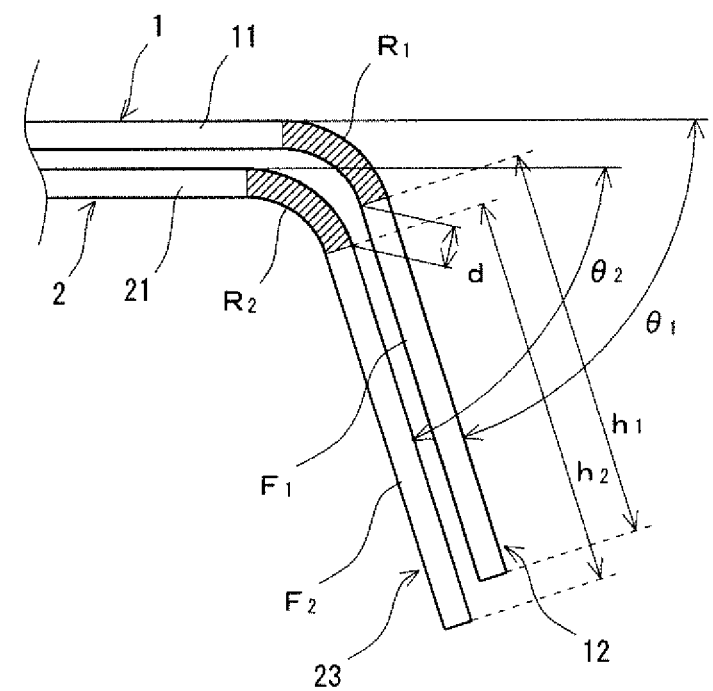
FIG. 2B is an enlarged sectional view of a part of the bumper reinforcement shown in FIG. 2A.

FIG. 1 is a perspective view to show an example of the BR of the present embodiment. FIGS. 2A and 2B are each a cross sectional view of the BP of the present embodiment. The cross section herein refers to a cross section across the lengthwise direction of the BR and is shown in FIG. 1 by the line IIA-IIA. The other cross sectional views of FIGS. 3 and 6A-6C are also based on the cross sectional direction shown in FIG. 1. Specifically, FIGS. 2A and 2B are cross sectional views of a BR attached to the vehicle viewed from sideward of the vehicle. Among these figures, FIG. 2A shows the entire area of a cross section. FIG. 2B shows a part of a cross section. FIG. 2B shows side edge parts of the first and second members including the first and second parts in the BR of the present embodiment.

As shown in FIGS. 1 to 2B, a bumper reinforcement 10 of the present embodiment includes a first member 1 and a second member 2. The first member 1 is made of steel sheet, and corresponds to a long-size closing plate. The second member 2 is made of steel sheet and corresponds to a long-size panel. These first and second members 1 and 2 are formed by press working.

The first member 1 includes a first flat sheet 11 and two first parts 12. The first flat sheet 11 and the first part 12 extend in a direction, that is, in the lengthwise or longitudinal direction of the BR 10. In terms of the BR 10 being attached to the vehicle, the first flat sheet 11 and the first part 12 extend in a vehicle width direction (see the double-pointed arrow identified as an X direction in FIG. 1). Therefore, the two side edges of the first flat sheet 11 extend along the lengthwise direction of the BR 10. The first parts 12 are connected to all of the two side edges of the first flat sheet 11. Each first part 12 is bent from the side edge of the first flat sheet 11, and stands up with respect to or extends from the first flat sheet 11. Such first member 1 has a generally C-shaped cross section in which side edge parts are bent.

Note that the first flat sheet 11 may be strictly flat-shaped, or may be curved to some extent. Moreover, the first flat sheet 11 may be provided with unevenness or holes.

The second member 2 includes a second plate 24, two wall parts 22, two flanges 21, and two second parts 23. The second plate 24, the vertical wall parts 22, the flanges 21 and the second parts 23 extend in the lengthwise direction of the BR 10 (vehicle width direction). Therefore, the two side edges of the second plate 24 extend along the lengthwise direction of the BR 10. The wall parts 22 are connected to all of the two side edges of the second plate 24. The flanges 21 are respectively connected to the two wall parts 22. The flanges 21 are substantially parallel with the second plate 24. The side edges of the flange 21 extend along the lengthwise direction of the BR 10. The second part 23 is connected to all of the side edges of the two flanges 21. The second part 23 is bent from the side edge of the flange 21 and stands up with respect to or extends from the flange 21. Such second member 2 has a generally hat-shaped cross section in which side edge parts are bent.

Note that the second plate 24 and the wall parts 22 may be strictly flat-shaped, or may be curved to some extent. Moreover, the second plate 24 and the wall parts 22 may be provided with unevenness or holes.

The first member 1 and the second member 2 are integrated by being joined by welding. Specifically, two flanges 21 of the second member 2, and the first flat sheet 11 of the first member 1 are superposed on each other, and the superposed parts are joined by spot welding. A joined part 3 between the first member 1 and the second member 2 is made up along a lengthwise direction (vehicle width direction) of the BR 10 (see FIG. 1). In this way, the BR 10 having a closed cross section is assembled.

In the BR 10 of the present embodiment, the first part 12 stands up or extends toward the second member 2 side. The second part 23 is disposed on the inner side of the first part 12.

The BR 10 is attached to a front part of a vehicle. In this case, the first member 1 is disposed facing forward (the outside) of the vehicle. Therefore, the first part 12 protrudes toward rearward (the inside) of the vehicle, and a collision load is inputted to the first member 1 side (see the void arrow in FIG. 2A). The two wall parts 22 of the second member 2 lie substantially parallel with the direction of collision load. On the other hand, when the BR 10 is attached to the rear part of the vehicle, the first member 1 is disposed facing toward rearward (the outside) of the vehicle.

As shown in FIG. 2B, the first part 12 of the first member 1 includes a first ridge $R_1$ adjacent to the first flat sheet 11, and a first flat portion $F_1$ adjacent to the first ridge $R_1$. Specifically, by providing the first part 12 in the first member 1, the first ridge $R_1$ along the lengthwise direction is made up on the side edge of the first member 1. Further, the first flat portion $F_1$ standing up with respect to or extending from the first flat sheet 11 is made up.

Similarly, the second part 23 of the second member 2 includes a second ridge $R_2$ adjacent to the flange 21, and a second flat portion $F_2$ adjacent to the second ridge $R_2$. Specifically, by providing the second part 23 in the second member 2, the second ridge $R_2$ along the lengthwise direction is made up on the side edge of the second member 2. Further, the second flat portion $F_2$ standing up with respect to or extending from the flange 21 is made up.

According to the BR 10 of the present embodiment, a first ridge $R_1$ is made up on the side edge of the first member 1 (CP). Further, a second ridge $R_2$ is made up on the side edge of the second member 2 (panel). This results in increase of the rigidities of the first member 1 and the second member 2. Therefore, deformation of the vicinity of the joined part 3 upon collision is suppressed. As a result, it becomes possible to suppress break-off of the joined part 3. Therefore, the BR 10 can sufficiently absorb collision load.

Here, regarding the first part 12 of the first member 1, it is preferable that an upstanding angle $\theta_1$ of the first flat portion $F_1$ with respect to the first flat sheet 11 is not less than 60° and less than 180°. Similarly, regarding the second part 23 of the second member 2, it is preferable that an upstanding angle $\theta_2$ of the second flat portion $F_2$ with respect to the flange 21 is not less than 60° and less than 180°. A more preferable range of upstanding angles $\theta_1$ and $\theta_2$ is from not less than 75° to not more than 105°. If the upstanding angles $\theta_1$ and $\theta_2$ are within that range, suppression effect against break-off of the joined part 3 is effectively exhibited. The upstanding angle $\theta_1$ of the first flat portion $F_1$ and the upstanding angle $\theta_2$ of the second flat portion $F_2$ may be the same or different. Considering the formability of the first member 1 and the second member 2, and assembling workability of the BR 10, the most preferable upstanding angles $\theta_1$ and $\theta_2$ are 90°.

Regarding the first part 12, a radius of curvature of the first ridge $R_1$ is preferably 0 to 10 mm. Similarly, regarding the second part 23, the radius of curvature of the second ridge $R_2$ is preferably 0 to 10 mm. A more preferable range of radius of curvature of the ridges $R_1$ and $R_2$ is 0 to 5 mm. If the radius of curvature is within that range, it is possible to effectively suppress break-off of the joined part 3. The radius of curvature of the first ridge $R_1$ and the radius of curvature of the second ridge $R_2$ may be the same, or different. Note that, the radii of curvature of the ridges $R_1$ and $R_2$ respectively means radii of curvature of contours on the inner peripheral side of the ridges $R_1$ and $R_2$.

For the first part 12, a length (flat part length) $h_1$ of the first flat portion $F_1$ may be more than 0 mm. Similarly, for the second part 23, a length (flat part length) $h_2$ of the second flat portion $F_2$ may be more than 0 mm. More preferable lengths $h_1$ and $h_2$ are not less than 5 mm. Because excessively small lengths $h_1$ and $h_2$ will decrease suppression effect against break-off of the joined part 3. However, excessively large lengths $h_1$ and $h_2$ will result in increase in the weight of the entire BR 10. For that reason, upper limits of the lengths $h_1$ and $h_2$ are preferably about 15 mm.

The length $h_1$ of the first flat portion $F_1$ and the length $h_2$ of the second flat part $F_2$ may be the same, or different. However, if the difference between the lengths $h_2$ and $h_1$ is excessively large, significant difference occurs between deformation behaviors of the first part 12 and the second part 23 upon collision. This may cause the joined part 3 to be broken off. Therefore, a ratio ($h_2/h_1$) of the length $h_2$ of the second flat portion $F_2$ and the length $h_1$ of the first flat portion $F_1$ is preferably in a range of 0.6 to 1.67. A more preferable range of the ratio of length ($h_2/h_1$) is 0.7 to 1.4.

As shown in FIG. 2B, a gap (gap between first and second parts) d between a boundary between the second ridge $R_2$ and the second flat portion $F_2$, and a boundary between the first ridge $R_1$ and the first flat portion $F_1$ may be not less than 0 mm. Particularly, the gap d between first and second parts is preferably as close to 0 as possible. Most preferable condition is a state in which both the boundaries are in contact (d=0). This is because, as the gap d between first and second parts decreases, the suppression effect against break-off of the joined part 3 increases. On the other hand, excessively large gap d will decrease suppression effect against break-off of the joined part 3. In this case, since the width of the first member 1 expands, the weight of the entire BR 10 increases. Hereinafter, results of investigation of effects of the gap d on the break-off of the joined part 3 are shown.

Figure 3:
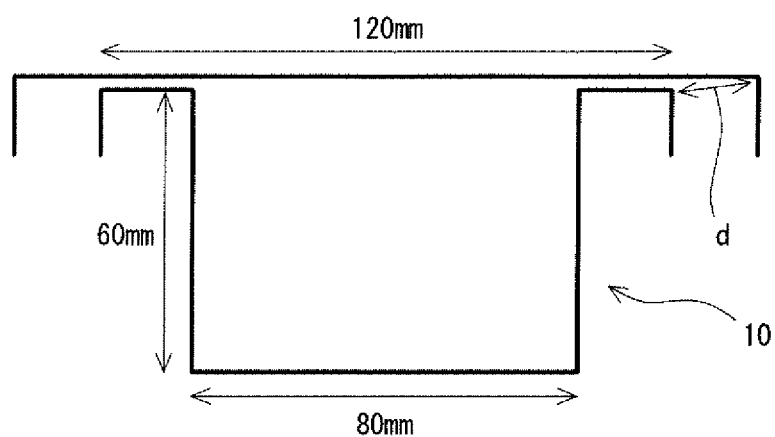
FIG. 3 is a cross sectional view to schematically show the bumper reinforcement of the present embodiment, which has been used for investigation relating to break-off of a joined part.

FIG. 3 is a cross sectional view to schematically show the BR of the present embodiment, which has been used for the investigation relating to break-off of joined part. As shown in FIG. 3, as specimens, a plurality of BRs 10 constituted by the first member (CP) and the second member (panel) were prepared. In the plurality of specimens, the gap d between first and second parts was variously varied. The first member and the second member are respectively formed by subjecting cold-rolled steel sheet to press working at a room temperature. The steel sheet had a sheet thickness of 2 mm, and a tensile strength of 1310 MPa. Joining of the first member and the second member was performed by welding using a single-phase alternating-current spot welding machine. In spot welding, welding pressure was 500 kgf, energization time was 20 cycles, and current value was 7.3 kA. In this way, a BR 10 having a total length of 1000 mm was fabricated.

In the second member (panel) constituting the BR 10, the second plate had a width of 80 mm, and the vertical wall part had a height of 60 mm. The total width of the second member, that is, the length from the side edge of one flange to the side edge of the other flange, was 120 mm. Moreover, each ridge of the first part and the second part had a radius of curvature of 5 mm. Moreover, each flat portion of the first part and the second part had an upstanding or extending angle of 90°. Each flat portion of the first part and the second part had a length of 10 mm. Moreover, the spacing between a plurality of welded parts (welded spots) made up along the lengthwise direction of the BR 10 was 30 mm. The nugget diameter of welded part was 6 mm. Changing of the gap d between first and second parts was performed by changing the total width of the first member.

Then, for a plurality of BRs 10 having different gaps d between first and second parts, a 3-point bending crush test was conducted. Note that the essentials of this test were the same as those in the test of Examples described below. Results thereof are shown in FIG. 4.

Figure 4:
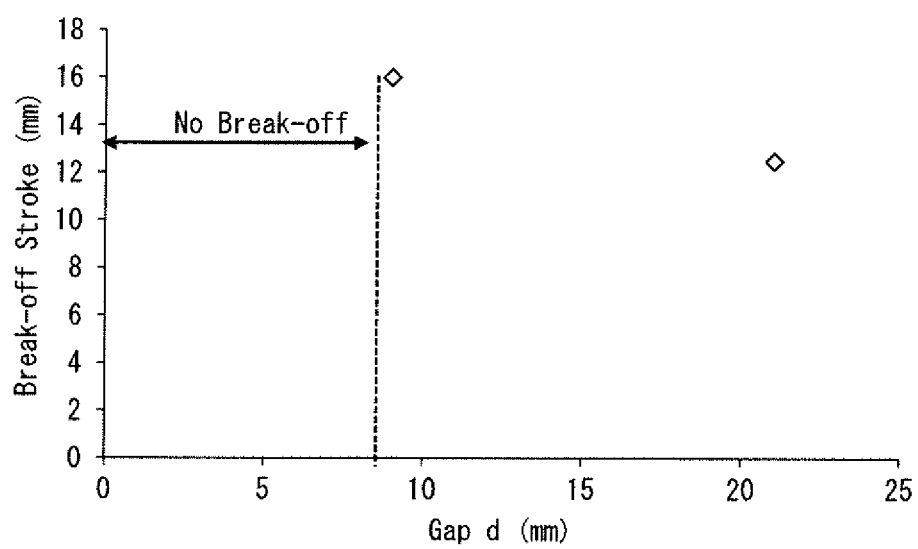
FIG. 4 is a diagram to show results of investigation relating to break-off of the joined part by the bumper reinforcement of the present embodiment.

FIG. 4 is a diagram to show results of investigation on break-off of joined parts by the BR of the present embodiment. In FIG. 4, the abscissa indicates the gap d between first and second parts, and the ordinate indicates the stroke of an impactor upon break-off of the joined part. As shown in FIG. 4, when the gap d between first and second parts was not less than 9 mm, break-off of joined part occurred.

This is considered to be due to the following reasons. As the gap d between first and second parts increases, the distance between the first ridge made up on the side edge and a joined part between the first member and the second member increases. In other words, the distance between the first part and the joined part increases. For that reason, suppression of deformation in the vicinity of the joined part 3 in the first member will not effectively occur. As a result of that, suppression effects against break-off of joined parts decrease.

Therefore, the gap d between the first and second parts is preferably not less than 0 mm, and less than 9 mm. In another aspect, the distance between the first part 12 and the joined part 3 is preferably not less than 5 mm, and not more than 16.5 mm. Moreover, the distance between the second part 23 and the joined part 3 is preferably not less than 6 mm, and not more than 17.5 mm.

In the BR 10 of the present embodiment, the first part 12 (first flat portion $F_1$) of the first member 1 and the second part 23 (flat portion $F_2$) of the second member 2 must not be joined. In other words, the first part 12 and the second part 23 must not be integrated together, even when they are in contact with each other.

If the first part 12 and the second part 23 are integrated, when the BR 10 receives collision load, individual deformation of the first upstanding part 12 and the second part 23 is restricted, and deviation due to deformation of the both cannot be tolerated. For that reason, shear stress occurs in the joined part 3. As a result, possibility that the joined part 3 is broken off in an early stage increases.

Note that in the examples shown in FIGS. 1 and 2A, the cross sectional shape of one first part 12 and the cross sectional shape of the other first upstanding part 12 are symmetric to each other. However, the cross sectional shapes of the both may be non-symmetric. Similarly, the cross sectional shape of one second part 23 and the cross sectional shape of the other second part 23 may be symmetric, or non-symmetric.

Moreover, in the examples shown in FIGS. 1 and 2A, the BR 10 is constituted by two members, which are the first member 1 and the second member 2. However, a third member may be provided as a reinforcement member between the first member 1 and the second member 2.

Figure 5:
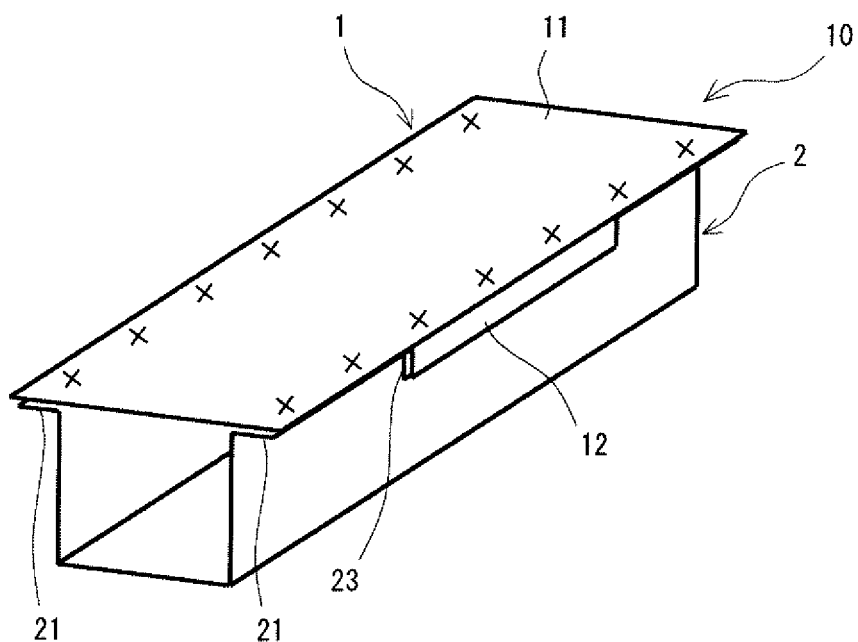
FIG. 5 is a perspective view to show another example of the bumper reinforcement of the present embodiment.

FIG. 5 is a perspective view to show another example of the BR of the present embodiment. As shown in FIG. 5, in the present embodiment, the first and second parts 12 and 23 are provided in a central area in the lengthwise direction of the BR 10. Specifically, the first part 12 is provided on a part of each of the two side edges of the first flat plate sheet 11 in the first member 1. The second part 23 is provided on a part of each side edge of the two flanges 21 in the second member 2 so as to coincide with the position of the first part 12. Such a BR 10 can even achieve similar effects to those by the above described BR 10.

Typically, the BR attached to the vehicle body is supported at its both ends. Upon collision, the BR is often subjected to a high load at a furthest portion from the supporting point (a central part in the lengthwise direction of the BR). In this case, the central part in the lengthwise direction of the BR undergoes bending deformation. Therefore, there is a risk that the joined part is broken off at the central part in the lengthwise direction of the BR. Then, as shown in FIG. 5, providing the first and second parts 12 and 23 in a central area in the lengthwise direction of the BR 10 enables to restrain the weight of the BR 10 to a necessary minimum while suppressing break-off of the joined part. Therefore, the BR 10 shown in FIG. 5 is light weight, and can sufficiently absorb collision load. In the case of this BR 10, the first and second parts 12 and 23 are preferably provided at least within a region from −50 mm to +50 mm from the central part in the lengthwise direction of the BR 10.

EXAMPLES

In order to confirm effects by the present embodiment, a 3-point bending crush test was conducted for three types of BRs: Example, Comparative Example 1, and Comparative Example 2, to evaluate collision performance of a BR.

Figure 6A:
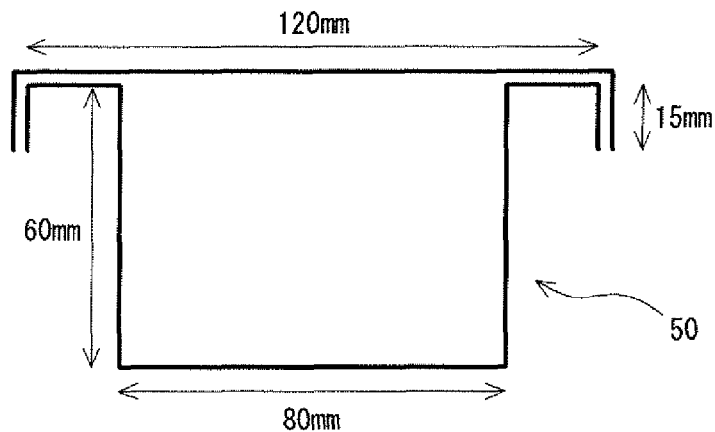
FIG. 6A is a cross sectional view to schematically show a bumper reinforcement of Example.
Figure 6B:
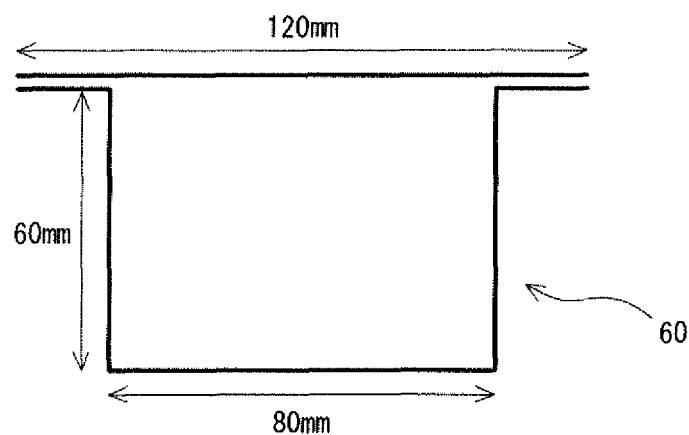
FIG. 6B is a cross sectional view to schematically show a bumper reinforcement of Comparative Example 1.
Figure 6C:
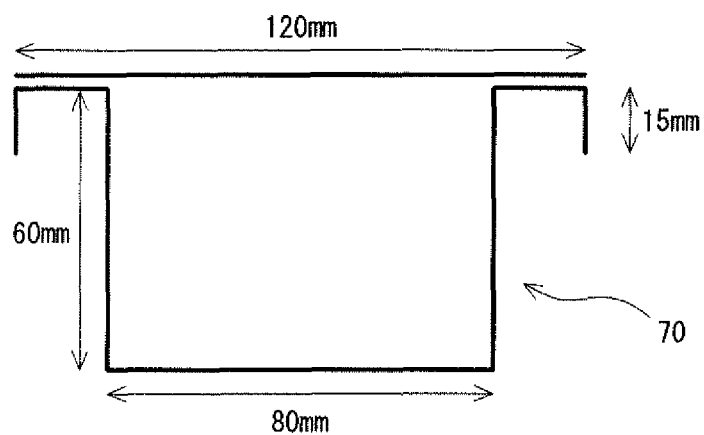
FIG. 6C is a cross sectional view to schematically show a bumper reinforcement of Comparative Example 2.

FIG. 6A is a cross sectional view to schematically show a BR of Example. FIG. 6B is a cross sectional view to schematically show a BR of Comparative Example 1. FIG. 6C is a cross sectional view to schematically show a BR of Comparative Example 2.

As shown in FIG. 6A, in Example, a BR 50 constituted by a first member (CP) and a second member (panel) was prepared. This BR 50 is in conformity with the BR 10 shown in FIG. 1. The first member and the second member were, respectively, formed by subjecting a cold-rolled steel sheet to press working at a room temperature. The steel sheet had a thickness of 2 mm, and a tensile strength of 1310 MPa. Joining of the first member 1 and the second member 2 was performed by welding using a single-phase alternating-current spot welding machine. In spot welding, welding pressure was 500 kgf, energization time was 20 cycles, and current value was 7.3 kA. In this way, a BR 50 having a total length of 1000 mm was fabricated.

In the second member of the BR 50 of Example, the second plate part had a width of 80 mm, and the vertical wall part had a height of 60 mm. The second member had a total width of 120 mm. Moreover, the first part and the second part each had a length of 15 mm. Moreover, the ridge of each of the first part and the second part had a radius of curvature R of 5 mm. The angle of the flat portion of each of the first part and the second part was 90°. The flat portion of each of the first part and the second upstanding part had a length of 10 mm. All of the gaps d between first and second parts were 0 mm. Moreover, spacing of a plurality of welded spots made up along the lengthwise direction of the BR 50 was 30 mm. The nugget diameter of a welded part was 6 mm.

As shown in FIG. 6B, in Comparative Example 1, a BR 60 constituted by a first member (CP) and a second member (panel) was prepared. In this BR 60, neither the first part nor the second part of the BR 50 shown in FIG. 6A was provided. Otherwise, configurations were the same as those of the BR 50 shown in FIG. 6A.

As shown in FIG. 6C, in Comparative Example 2, a BR 70 constituted by a first member (CP) and a second member (panel) was prepared. In this BR 70, the first part of the BR 50 shown in FIG. 6A was not provided. Otherwise, configurations were the same as those of the BR 50 shown in FIG. 6A.

Figure 7:
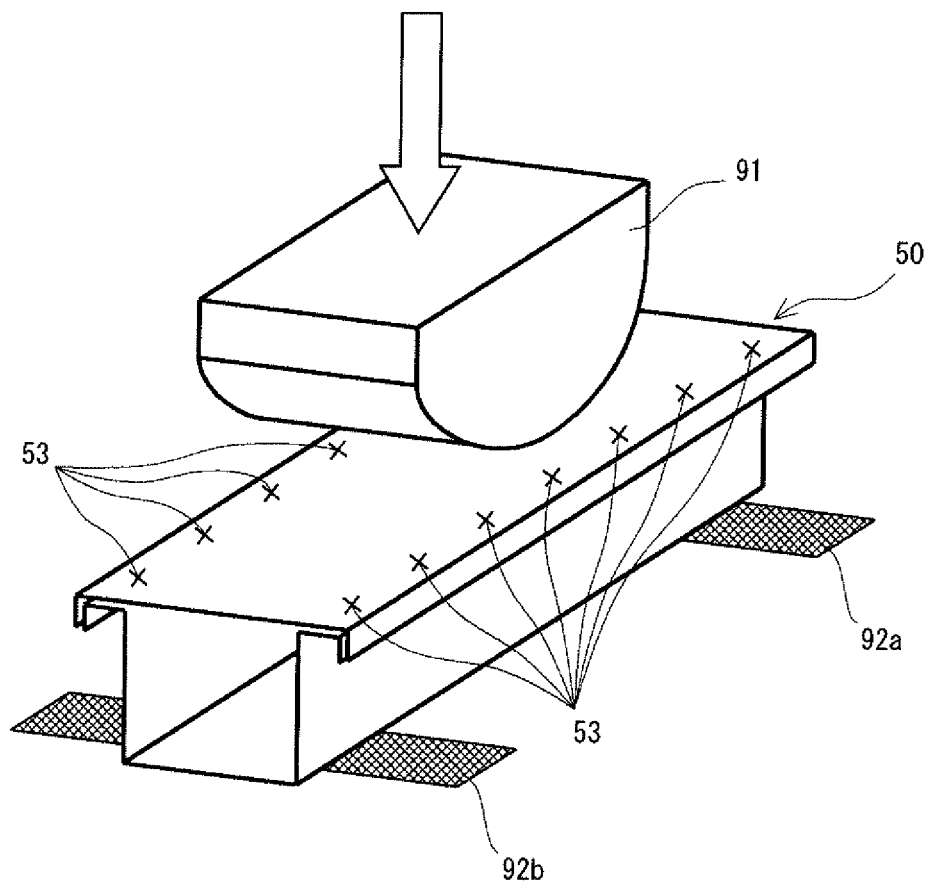
FIG. 7 is a schematic diagram to show an outline of a 3-point bending crush test.

FIG. 7 is a schematic diagram to show an outline of a 3-point bending crush test. Note that reference symbol 53 in FIG. 7 shows a joined part by spot welding.

As shown in FIG. 7, the BR 50 (60, 70) was supported at two points 92a and 92b from the second member (panel) side. The spacing between supporting points was 800 mm. An impactor 91 was caused to collide at the center in the lengthwise direction of the BR 50 from the first member (CP) side to crush the BR 50. The impactor 91 had a radius of curvature of 150 mm. Collision speed of the impactor 91 was 2500 mm/sec. Results thereof are shown in FIG. 8.

Figure 8:
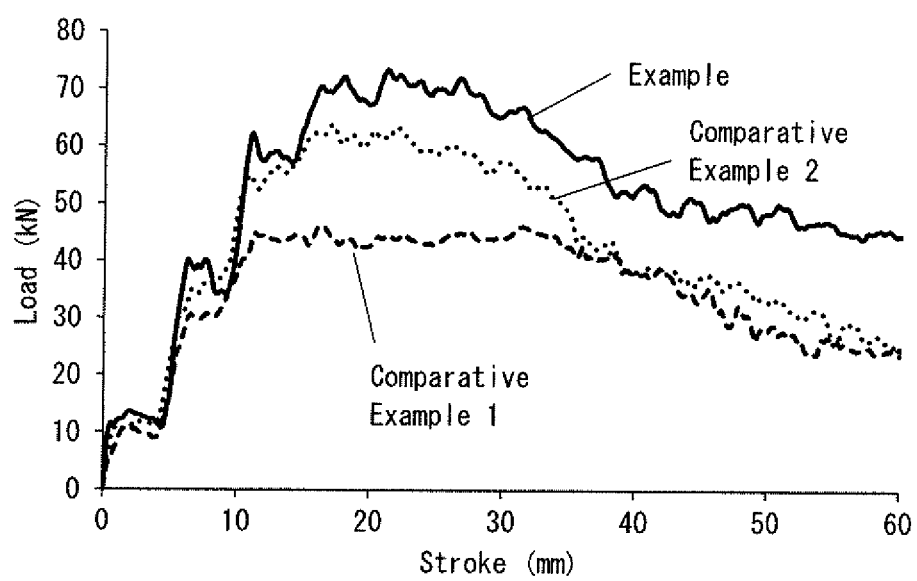
FIG. 8 is a diagram in which results of the 3-point bending crush test are summarized.
Figure 9A:
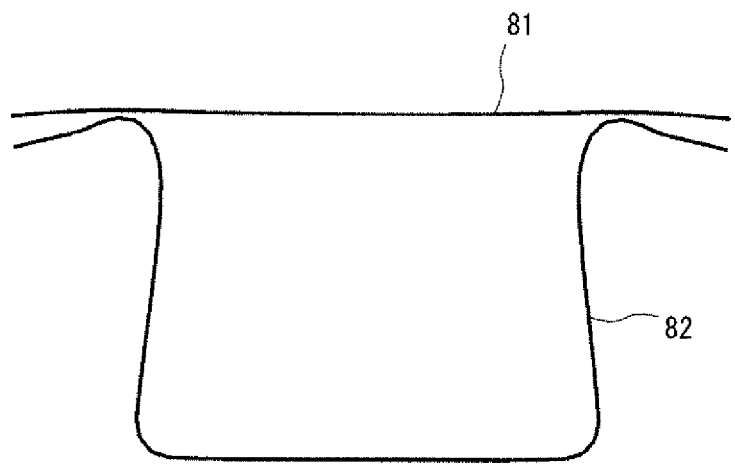
FIG. 9A is a schematic diagram to show one example of deformation behavior of a bumper reinforcement, which induces break-off of the joined part, and is a cross sectional view of the bumper reinforcement when viewed from sideward of the vehicle.
Figure 9B:
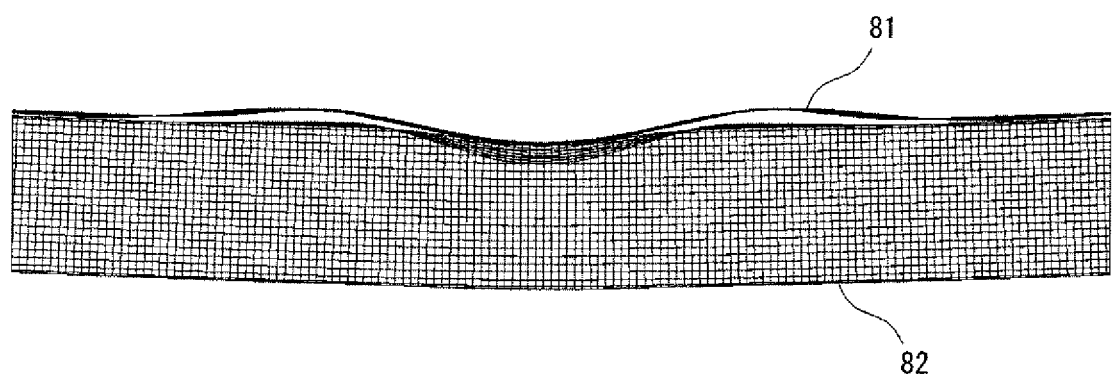
FIG. 9B is a plan view of the bumper reinforcement shown in FIG. 9A, when viewed from upward of the vehicle.

FIG. 8 is a diagram in which results of the 3-point bending crush test are summarized. In FIG. 8, the stroke of the impactor is shown in the abscissa, and load acting on the impactor, that is, load to which the BR is subjected is shown in the ordinate. Further, after the test, the joined parts of the BRs 50, 60, and 70 were observed to confirm whether or not break-off had occurred.

In the BR 50 of Example, no break-off of the joined part occurred. On the other hand, in the BR 60 of Comparative Example 1 and the BR 70 of Comparative Example 2, break-off of the joined part occurred.

Moreover, results shown in FIG. 8 reveal the following matters. While a maximum load of Example was 75 kN, the maximum load of Comparative Example 1 was 45 kN, and the maximum load of Comparative Example 2 was 62 kN. Therefore, it is seen that according to the BR of Example based on the present embodiment, the maximum load upon collision increases.

Note that preparing a BR in which joining was performed by laser welding instead of spot welding, a similar test as described above was conducted. Further, preparing a BR in which joining was performed by an adhesive instead of spot welding, a similar test as described above was conducted. In these tests as well, the same trends as those described above were confirmed.

The test results described so far have demonstrated that according to the BR and vehicle of the present embodiment, it is possible to suppress break-off of joined parts upon collision, and sufficiently absorb collision load.

REFERENCE SIGNS LIST

10 Bumper reinforcement
1 First member
11 First flat sheet
12 First part
2 Second member
21 Flange
22 Wall part
23 Second part
24 Second plate
3 Joined part

The invention claimed is:
1. A bumper reinforcement, comprising:
a first member including:
a first flat sheet having two opposing side edges, the first flat sheet and the two opposing side edges extending in a longitudinal direction, and
two first parts respectively extending from the two opposing side edges of the first flat sheet in a direction transverse to the longitudinal direction, each of the first parts extending along all or a part of each of the side edges of the first flat sheet; and
a second member including:
a second plate having two opposing side edges, the second plate and the two opposing side edges thereof extending in the longitudinal direction,
two wall parts respectively connected to the two opposing side edges of the second plate along the longitudinal direction,
two flanges, each having a side edge along the longitudinal direction, the two flanges respectively connected to an edge of each of the two wall parts, and
two second parts respectively connected to and extending in a direction transverse to the longitudinal direction from the side edges of the two flanges, the second parts aligned in the longitudinal direction with the first parts, wherein the two flanges of the second member and the first flat sheet of the first member are joined together, the first part extends along a side of the second member, and the first part and the second part are not integrated together.

2. The bumper reinforcement according to claim 1, wherein each first part includes a first ridge adjacent to the first flat sheet, and a first flat portion adjacent to the first ridge, each second part includes a second ridge adjacent to the flange, and a second flat portion adjacent to the second ridge, and in a cross section of the bumper reinforcement across the longitudinal direction, a first boundary exists between the second ridge and the second flat portion, and a second boundary exists between the first ridge and the first flat portion, and a gap exists between the first boundary and the second boundary, the gap being between 0 mm and 9 mm.

3. The bumper reinforcement according to claim 2, wherein in the cross section of the bumper reinforcement across the longitudinal direction, the first and second flat portions each have a length of not less than 5 mm.

4. The bumper reinforcement according to claim 1, wherein at least one of the first member and the second member has a tensile strength of not less than 1180 MPa.

5. The bumper reinforcement according to claim 2, wherein at least one of the first member and the second member has a tensile strength of not less than 1180 MPa.

6. The bumper reinforcement according to claim 3, wherein at least one of the first member and the second member has a tensile strength of not less than 1180 MPa.

7. A vehicle, comprising the bumper reinforcement according to claim 1, the bumper reinforcement located in a front part or a rear part of the vehicle, wherein the first member faces toward an outside of the vehicle.

8. A vehicle, comprising the bumper reinforcement according to claim 2, the bumper reinforcement located in a front part or a rear part of the vehicle, wherein the first member faces toward an outside of the vehicle.

9. A vehicle, comprising the bumper reinforcement according to claim 3, the bumper reinforcement located in a front part or a rear part of the vehicle, wherein the first member faces toward an outside of the vehicle.

10. A vehicle, comprising the bumper reinforcement according to claim 4, the bumper reinforcement located in a front part or a rear part of the vehicle, wherein the first member faces toward an outside of the vehicle.

11. A vehicle, comprising the bumper reinforcement according to claim 5, the bumper reinforcement located in a front part or a rear part of the vehicle, wherein the first member faces toward an outside of the vehicle.

12. A vehicle, comprising the bumper reinforcement according to claim 6, the bumper reinforcement located in a front part or a rear part of the vehicle wherein the first member faces toward an outside of the vehicle.

* * * * *